(12) United States Patent
Nakayama

(10) Patent No.: US 11,046,246 B2
(45) Date of Patent: Jun. 29, 2021

(54) ALARM APPARATUS AND ALARMING METHOD

(71) Applicant: DENSO ELECTRONICS CORPORATION, Anjo (JP)

(72) Inventor: Toshiaki Nakayama, Kariya (JP)

(73) Assignee: DENSO ELECTRONICS CORPORATION, Anjo (JP)

( * ) Notice: Subject to any disclaimer, the term of this patent is extended or adjusted under 35 U.S.C. 154(b) by 0 days.

(21) Appl. No.: 16/795,407

(22) Filed: Feb. 19, 2020

(65) Prior Publication Data

US 2020/0180506 A1    Jun. 11, 2020

Related U.S. Application Data

(63) Continuation of application No. PCT/JP2018/035122, filed on Sep. 21, 2018.

(30) Foreign Application Priority Data

Sep. 27, 2017 (JP) ............................ JP2017-186709

(51) Int. Cl.
*B60Q 1/00* (2006.01)
*B60Q 5/00* (2006.01)
*B60W 50/14* (2020.01)

(52) U.S. Cl.
CPC ............ *B60Q 5/008* (2013.01); *B60W 50/14* (2013.01); *B60W 2050/143* (2013.01)

(58) Field of Classification Search
CPC .. B60Q 5/008; B60W 50/14; B60W 2050/143

USPC ........................................................ 340/425.5
See application file for complete search history.

(56) References Cited

U.S. PATENT DOCUMENTS

| 4,366,482 A * | 12/1982 | Remes .................... H04B 1/04 331/64 |
| 4,456,387 A * | 6/1984 | Igarashi ................. G04C 21/02 368/230 |
| 4,980,837 A * | 12/1990 | Nunn .................... B06B 1/0284 116/147 |
| 6,097,315 A * | 8/2000 | Minter ................. G08G 5/0021 340/961 |
| 8,212,656 B2 * | 7/2012 | Nakayama ................ G01S 7/52 340/384.1 |
| 8,217,766 B2 * | 7/2012 | Nakayama ............. B60Q 5/006 340/384.1 |
| 8,248,273 B2 * | 8/2012 | Hayashi .................... G08G 1/04 340/943 |
| 8,451,143 B2 * | 5/2013 | Nakayama ............. B60Q 5/008 340/933 |

(Continued)

FOREIGN PATENT DOCUMENTS

| JP | 2008062666 A | 3/2008 |
| JP | 2011037442 A | 2/2011 |

(Continued)

*Primary Examiner* — Kerri L McNally
*Assistant Examiner* — Thang D Tran
(74) *Attorney, Agent, or Firm* — Harness, Dickey & Pierce, P.L.C.

(57) ABSTRACT

An alarm apparatus mounted on a vehicle is provided to output an alarm sound around the vehicle. The alarm apparatus generates a sound wave signal having a frequency that is hardly masked by an environmental sound, and outputs an alarm sound based on the sound wave signal.

12 Claims, 10 Drawing Sheets

(56) References Cited

U.S. PATENT DOCUMENTS

| | | | | |
|---|---|---|---|---|
| 8,680,964 B2* | 3/2014 | Nakayama | ............ | B60Q 5/008 340/5.2 |
| 2004/0252015 A1* | 12/2004 | Galperin | ............ | G06K 19/0701 340/5.64 |
| 2005/0280519 A1* | 12/2005 | Nagata | .................... | B60Q 5/00 340/435 |
| 2008/0088409 A1* | 4/2008 | Okada | ................ | G07C 9/00309 340/5.2 |
| 2010/0231368 A1* | 9/2010 | Nakayama | ............. | B60Q 5/00 340/425.5 |
| 2010/0277356 A1* | 11/2010 | Michiyochi | ........... | H03L 7/0891 341/144 |
| 2011/0032087 A1* | 2/2011 | Nakayama | ............. | G01S 15/86 340/384.1 |
| 2011/0032122 A1* | 2/2011 | Hayashi | .................. | G08G 1/04 340/943 |
| 2011/0175713 A1* | 7/2011 | Nakayama | ............. | B60Q 5/008 340/435 |
| 2011/0181442 A1* | 7/2011 | Nakayama | ............. | B60Q 5/008 340/933 |
| 2012/0051563 A1* | 3/2012 | Cronmiller | ............ | H04R 27/00 381/150 |
| 2012/0229267 A1* | 9/2012 | Nakayama | ............. | B60Q 5/008 340/463 |
| 2013/0076504 A1* | 3/2013 | Nakayama | ............. | G10K 15/02 340/466 |
| 2013/0321195 A1* | 12/2013 | Moriuchi | ............. | G01S 13/931 342/70 |
| 2014/0225722 A1* | 8/2014 | Takahashi | ............. | G08G 1/168 340/435 |
| 2015/0112686 A1* | 4/2015 | Kiyoshige | ............ | G10H 1/0083 704/258 |
| 2017/0003176 A1* | 1/2017 | Phan Le | ............ | G01N 29/032 |
| 2017/0262255 A1* | 9/2017 | Shih | ..................... | H04R 29/006 |
| 2017/0269209 A1* | 9/2017 | Hall | ......................... | G01S 17/10 |
| 2017/0315556 A1* | 11/2017 | Mimura | ............. | G08G 1/167 |
| 2017/0363732 A1* | 12/2017 | Ishimori | ................. | G01S 7/024 |
| 2018/0279598 A1* | 10/2018 | Hur | ......................... | A01M 1/06 |
| 2019/0041865 A1* | 2/2019 | Lipson | .................. | G01S 17/931 |
| 2019/0179017 A1* | 6/2019 | Nagai | ..................... | G01S 7/483 |

FOREIGN PATENT DOCUMENTS

| | | | |
|---|---|---|---|
| JP | 2011-105288 A | 6/2011 | |
| JP | 2011105288 | * 6/2011 | ............ B60Q 5/00 |
| JP | 2011168202 A | 9/2011 | |
| JP | 2012183933 A | 9/2012 | |
| JP | 2012217015 A | 11/2012 | |
| JP | 5704022 B2 | 4/2015 | |

* cited by examiner

ALARM APPARATUS AND ALARMING METHOD

CROSS REFERENCE TO RELATED APPLICATIONS

The present application is a continuation application of International Patent Application No. PCT/JP2018/035122 filed on Sep. 21, 2018, which designated the U.S. and claims the benefit of priority from Japanese Patent Application No. 2017-186709 filed on Sep. 27, 2017. The entire disclosures of all of the above applications are incorporated herein by reference.

TECHNICAL FIELD

The present disclosure relates to an alarm apparatus that is mounted on a vehicle and outputs an alarm sound to surrounding pedestrians and an alarming method.

BACKGROUND

There is proposed, as an alarm apparatus described above, a technology which generates an engine sound of the vehicle in a pseudo manner, and outputs the engine sound to the surroundings as an alarm sound, thereby making it easy for a nearby person such as a pedestrian to notice the approach of the vehicle.

SUMMARY

According to an example of the present disclosure, an alarm apparatus mounted on a vehicle is provided to output an alarm sound around the vehicle. The alarm apparatus generates a sound wave signal having a frequency that is hardly masked by an environmental sound, and outputs an alarm sound based on the sound wave signal.

EMBODIMENT FOR CARRYING OUT THE INVENTION

Hereinafter, embodiments of the present disclosure will be described with reference to the drawings.

1. First Embodiment

[1-1. Configuration Other than Processor]

Figure 1:
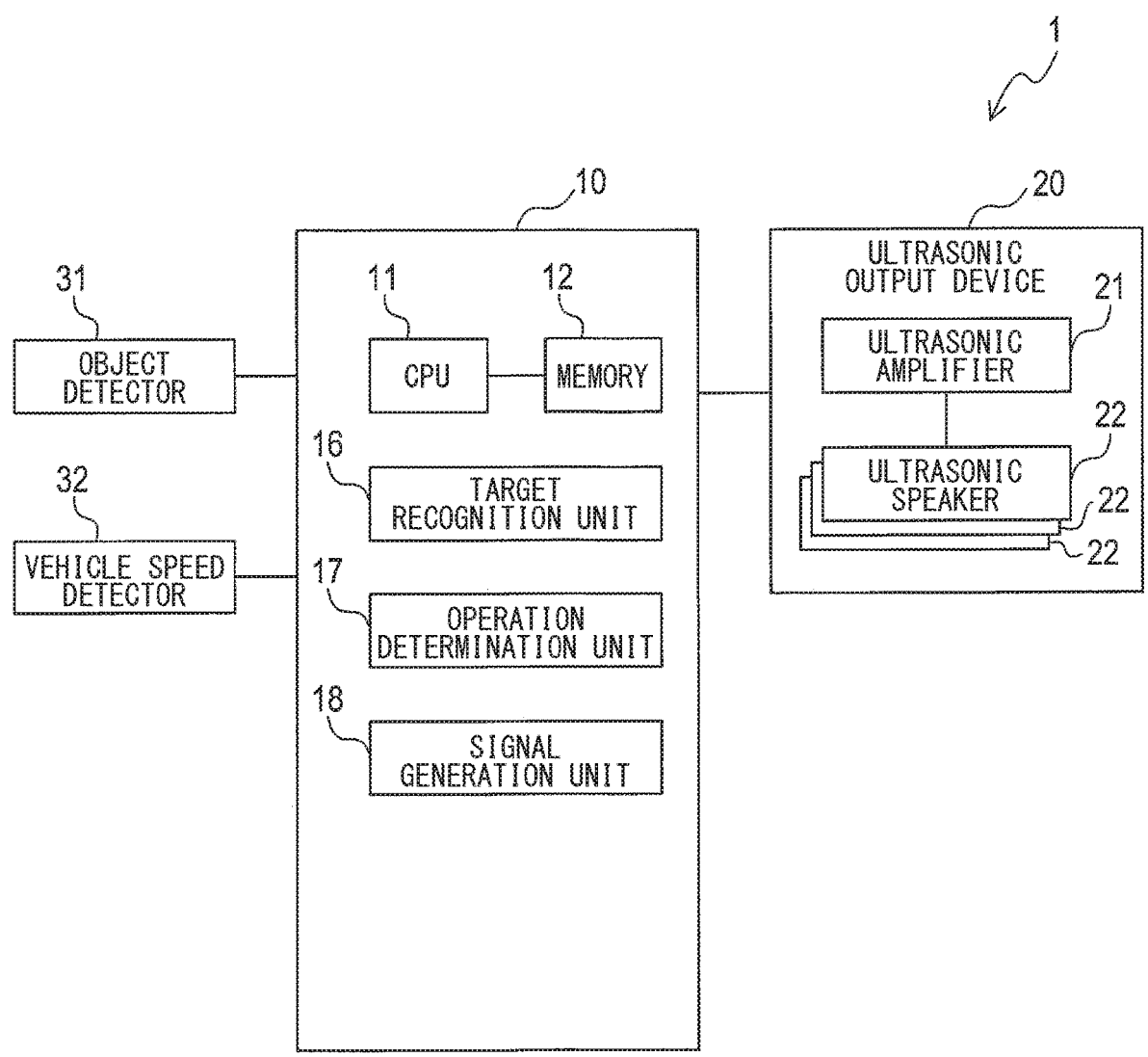
FIG. 1 is a block diagram showing a configuration of an alarm apparatus.

An alarm apparatus 1 shown in FIG. 1 is an apparatus that is mounted on a vehicle such as a passenger car, for example, and outputs an alarm sound indicating an approach of the vehicle to a target person located in a target area. Here, the target person represents a person who is a target to which an alarm is issued. For example, general pedestrians, bicycle riders, and the like correspond to the target person.

As shown in FIG. 1, the alarm apparatus 1 includes a processor 10 and an ultrasonic output device 20. The alarm apparatus 1 may include an object detector 31 and a vehicle speed detector 32.

The object detector 31 is configured as a well-known radar, camera, or the like, and acquires information such as a distance measurement point or a captured image about a target such as a target person or another vehicle by detection or image capture, and the acquired information is transmitted to the processor 10.

The vehicle speed detector 32 detects the vehicle speed V of the vehicle on which the alarm apparatus 1 is mounted, and transmits information on the vehicle speed V to the processor 10.

The ultrasonic output device 20 includes one or a plurality of ultrasonic amplifiers 21 and a plurality of ultrasonic speakers 22.

The ultrasonic amplifier 21 amplifies the waveform of the signal generated by the processor 10 so as to have a preset amplification factor, and outputs the amplified waveform from the ultrasonic speakers 22. As shown in FIG. 1, the ultrasonic amplifier 21 may be provided for a plurality of ultrasonic speakers 22, but may be provided for each ultrasonic speaker 22. Moreover, the number of ultrasonic speakers 22 need not be several and may be one.

The ultrasonic speaker 22 is an ultrasonic generator that generates air vibration having a frequency (for example, 20 kHz or more) higher than a human audible band, and is configured as, for example, a piezoelectric speaker suitable for ultrasonic reproduction. The piezoelectric speaker includes a ceramic speaker and the like.

Figure 2:
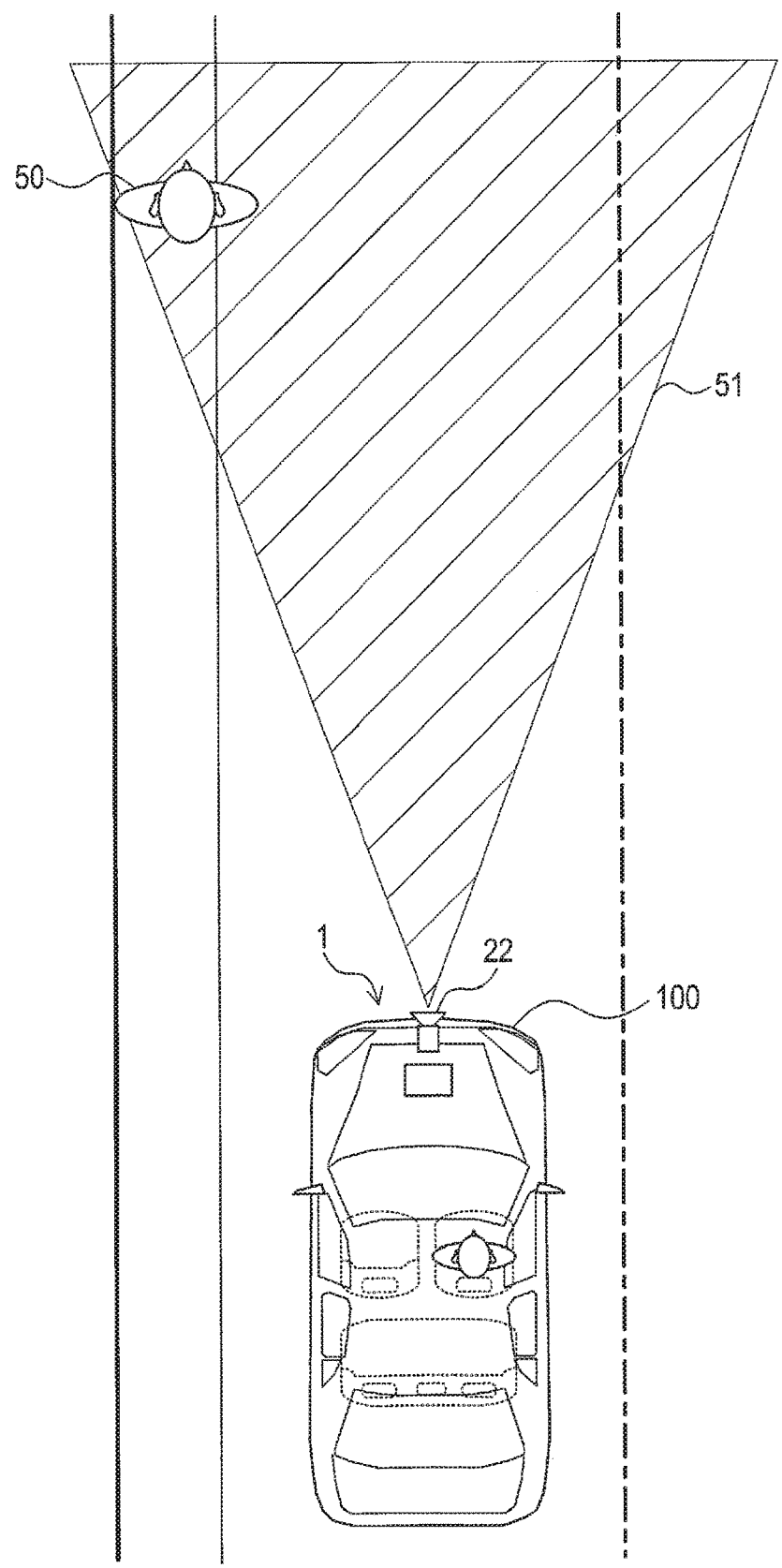
FIG. 2 is a plan view showing an arrangement example of an alarm apparatus.

As shown in FIG. 2, the ultrasonic speaker 22 is disposed, for example, on the front surface of the vehicle 100, and outputs sound waves, for example, forward as the traveling direction of the vehicle 100. The sound wave transmitted by the ultrasonic speaker 22 configures a sound field region 51. The sound field region 51 indicates a region that is −6 dB or more with respect to the sound pressure on the sound axis (i.e., the sound pressure at the center in the direction in which sound waves are output by the ultrasonic speaker 22). The alarm apparatus 1 is set so that the target person 50 in the sound field region 51 can recognize the alarm sound issued from the ultrasonic speaker 22.

[1-2. Configuration of Processor]

The alarm apparatus 1 realizes a configuration which outputs a specific sound wave via the ultrasonic speaker 22 to provide a target person 50 in the sound field region 51 with an alarm sound that is hardly masked by the environmental sound.

The processor 10 in the alarm apparatus 1 is mainly configured by a known microcomputer having a CPU 11 and a semiconductor memory (hereinafter, memory 12) such as a RAM, a ROM, and a flash memory. Various functions by the processor 10 are realized by the CPU 11 executing a program stored in a non-transitory tangible storage medium. In this example, the memory 12 corresponds to a non-transitory tangible storage medium storing the program.

Execution of this program allows the execution of a method in accordance with the program. Further, the number of microcomputers constituting the processor 10 may be one or several.

The processor 10 in the alarm apparatus 1 includes a target recognition unit 16 (which may be also referred to as a target recognizer), an operation determination unit 17 (which may be also referred to as an operation determiner), and a signal generation unit 18 (which may be also referred to as a signal generator), as elements of functions realized by the CPU 11 executing a program.

The method of realizing these elements included in the processor 10 is not limited to a software manner, and some or all of the elements may be realized using one or a plurality of hardware circuits. For example, when the above functions are implemented by an electronic circuit (i.e., hardware circuitry) that is hardware, the electronic circuit may be implemented by a digital circuit that includes a large number of logic circuits, an analog circuit, or a combination of the digital circuit and the analog circuit. That is, an individual one of the functions provided by the processor 10 may be implemented by (i) a central processing unit (CPU) along with memory storing instructions executed by the CPU or (ii) hardware circuitry such as an electronic circuit including an analog circuit and/or digital circuit with no CPU, or (iii) a combination of the CPU along with memory and the hardware circuitry.

In the processor 10 in the alarm apparatus 1, the function of the target recognition unit 16 recognizes the position and type of a target based on the information obtained by the object detector 31. This process can adopt a known technique such as a technique for identifying the type of an object from a plurality of distance measuring points or a technique for identifying the type of an object from a captured image.

In the function of the operation determination unit 17, when the target recognition unit 16 recognizes a preset target person for alarming such as a pedestrian or a bicycle, the ultrasonic output device 20 is controlled to generate an alarm sound.

In the function of the signal generation unit 18, a pattern sound is generated by modulating an ultrasonic wave having a first frequency to a second frequency lower than the first frequency; then, the generated pattern sound is output from the ultrasonic output device 20 as a sound having directionality. The reason why the function of the signal generation unit 18 generates the sound having directionality is to limit the range which the sound wave reaches to a region that is dangerous for a target person, and to make it difficult for the sound wave to spread to a region that is not dangerous. That is, a range which the sound wave reaches is generated by a sound having a characteristic that the sound pressure rapidly increases as it approaches the sound axis.

Specifically, in the function of the signal generation unit 18, a waveform indicating an alarm sound is generated by modulating an amplitude of a waveform of an ultrasonic wave having a predetermined frequency (for example, 40 kHz) with a constant amplitude so as to be shaped into a signal pattern indicating a predetermined alarm sound. In order to generate this waveform indicating an alarm sound, a waveform of the ultrasonic wave having a constant amplitude may be preferably amplitude modulated to a target frequency and then the output level of the modulated waveform is changed to match the signal pattern indicating the alarm sound.

Figure 3:
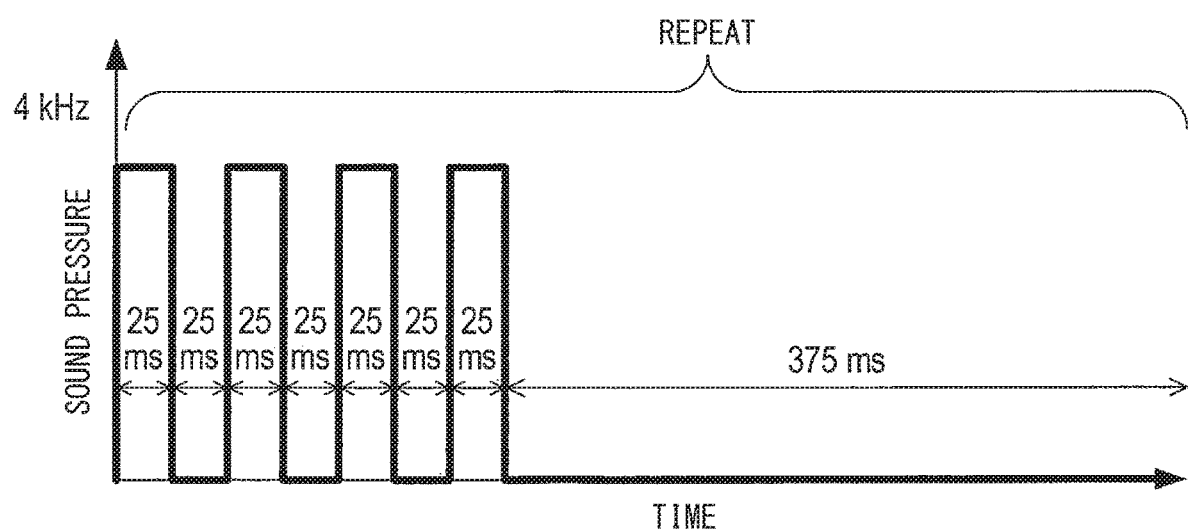
FIG. 3 is a graph showing an example of a signal pattern of an alarm sound.

In particular, in the present embodiment, the signal generation unit 18 is configured to generate a sound wave signal for outputting an audible sound having a pattern in which a stronger level and a weaker level are alternated a plurality of times as shown in FIG. 3. Here, human hearing has a tendency to hardly hear continuous sounds that are masked by environmental sounds, whereas having a tendency to easily hear sounds in which a stronger level and a weaker level are alternated a plurality of repetition times such as intermittent sounds, which are hardly masked by environmental sound.

For this reason, for example, the alarm sound is configured as exhibiting a signal pattern with a cycle of 550 ms, the single pattern in which four sub-patterns, in each of which a sounding period of 25 ms and a non-sounding period of 25 ms are alternated, are arranged and then a non-sounding period of 375 ms including the non-sounding period of 25 ms of the last fourth sub-pattern is arranged after the sounding period of the last fourth sub-pattern, as shown in FIG. 3.

The signal generation unit 18 is configured to generate the alarm sound as a sound wave signal that becomes an audible sound that simulates a sound of an insect. In order to simulate such a sound of an insect, the waveform of a sound of an insect may be analyzed and reproduced, or a sound of an insect may be recorded and reproduced as it is.

Here, research results are known that the sound with a high frequency generally gives an unpleasant feeling to humans, but that a sound of an insect hardly gives an unpleasant feeling despite of a sound with a high frequency (For example, see the papers of the Shizuoka Prefecture Student Science Award and the Prefecture Education Promotion Committee Award). In particular, the sound of bell-ringing cricket (*Meloimorpha japonicus*) is less likely to feel unpleasant as compared to other high frequency sounds such as the sound of other insects, the sound of glass cracking, and the sound of scratching the blackboard. In the present embodiment, a sound imitating a sound of bell-ringing cricket is used as an alarm sound.

The signal generation unit 18 is configured to generate a (post-modulation) sound wave signal after modulation by using a (pre-modulation) sound wave signal before modulation. That is, the pre-modulation sound wave signal is modulated. Thereby, the post-modulation sound wave signal is allowed to include a sound wave having a frequency after modulation; the frequency after modulation is within the range of 4 kHz to 5 kHz and corresponds to the quotient from dividing the frequency of the pre-modulation sound wave signal by a predetermined n which is an integer of two or more. Note that the sound of the bell-ringing cricket includes sounds in the range of 4 kHz to 5 kHz.

This configuration is provided based on the following knowledge found by the experimental result to be described later. The knowledge indicates that due to the characteristics of the shape of the human ear, a sound wave becoming audible by modulating an ultrasonic wave is heard as follows. The sound wave having a frequency of 2 kHz or higher is easily heard; in contrast, the sound wave having a frequency of less than 2 kHz is easily heard or not easily heard depending on the direction of the body of a person. The knowledge further indicates that due to the sound generation characteristics of an ultrasonic speaker, an alarm sound whose sound wave frequency is in the range of 4 kHz to 5 kHz is a sound wave having a frequency band in which a large sound pressure can be obtained, and is heard far away with little attenuation due to distance.

With such a configuration, an alarm sound with a larger sound pressure is provided to a target person, and the alarm sound is hardly masked by the environmental sound.

[1-3. Experimental Result]

The reason for outputting an alarm sound having the above frequency will be described using the following experimental results.

[1-3-1. Environmental Sound Measurement]

Figure 4:
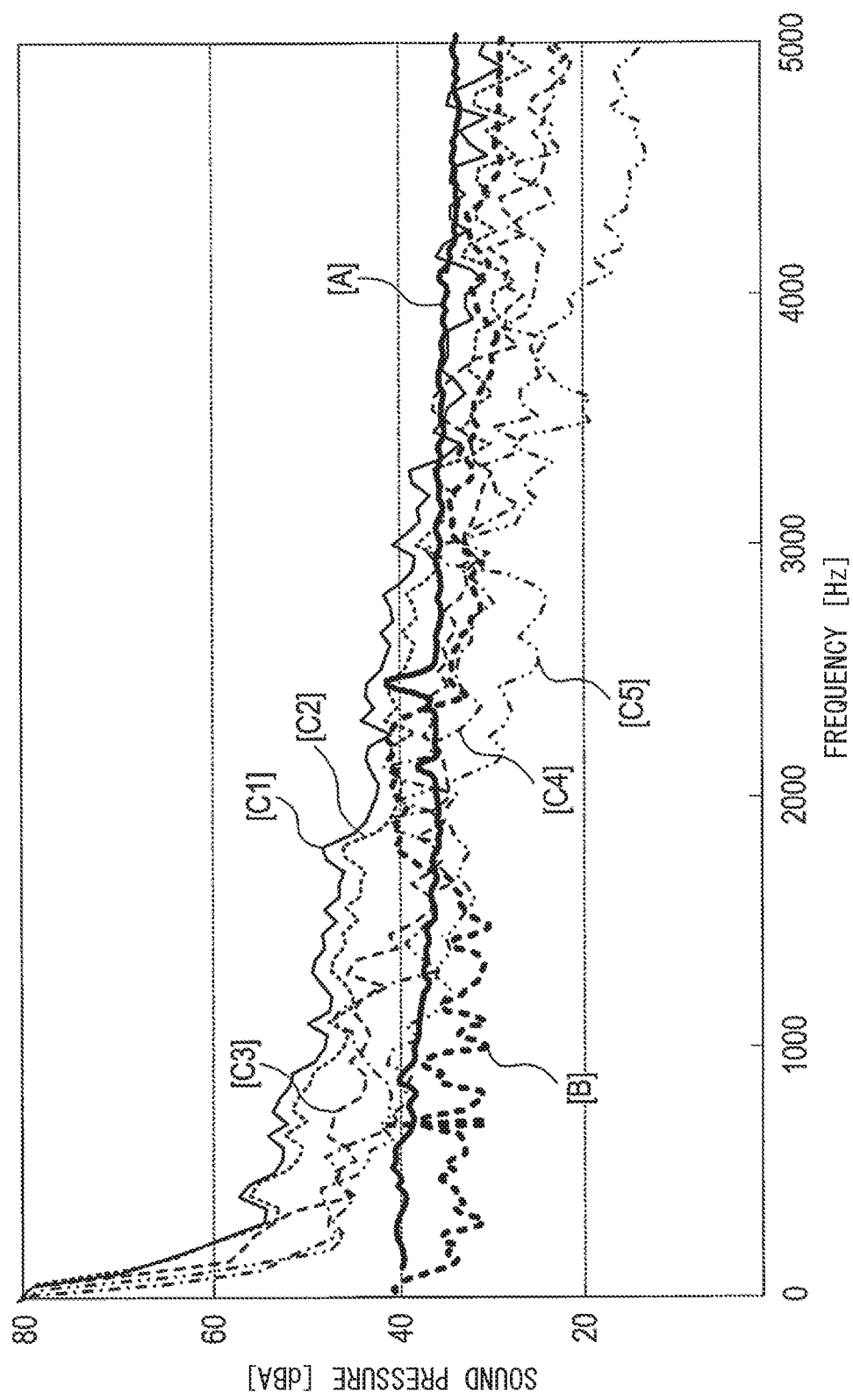
FIG. 4 is a graph showing an example of frequency distribution of human voice, engine sound, and environmental sound.

First, in FIG. 4, various sounds are decomposed and graphed for each frequency. In particular, the sound that can be heard by humans is indicated by [A], the engine sound of a vehicle about 30 m ahead is indicated by [B], and the environmental sounds around the road are indicated by [C1] to [C5].

The environmental sounds [C1] to [C5] each have a tendency such that a sound pressure is higher as the frequency is lower, and a sound pressure is lower as the frequency is higher. Since sounds with lower frequencies reach farther, it is considered that environmental sounds include many sounds with lower frequencies.

The sound [A] that can be heard by humans exceeds the sound pressure of the environmental sound [C1] to [C5] if it is approximately 3500 Hz or higher. However, the sound [A] that can be heard by humans has the sound pressure that is less than the sound pressures of the environmental sounds [C1] to [C5] at approximately 3500 Hz or less, and is masked by the environmental sounds [C1] to [C5] and becomes difficult to hear. Further, the engine sound [B] has the sound pressure that is substantially lower than the sound pressure of the environmental sounds [C1] to [C5] in the entire frequency region, and is masked by the environmental sounds [C1] to [C5] so that it is difficult to hear.

From this tendency, it can be seen that a sound of approximately 3500 Hz or more is not easily masked by the environmental sounds.

[1-3-2. Distance Attenuation Measurement]

Figure 5:
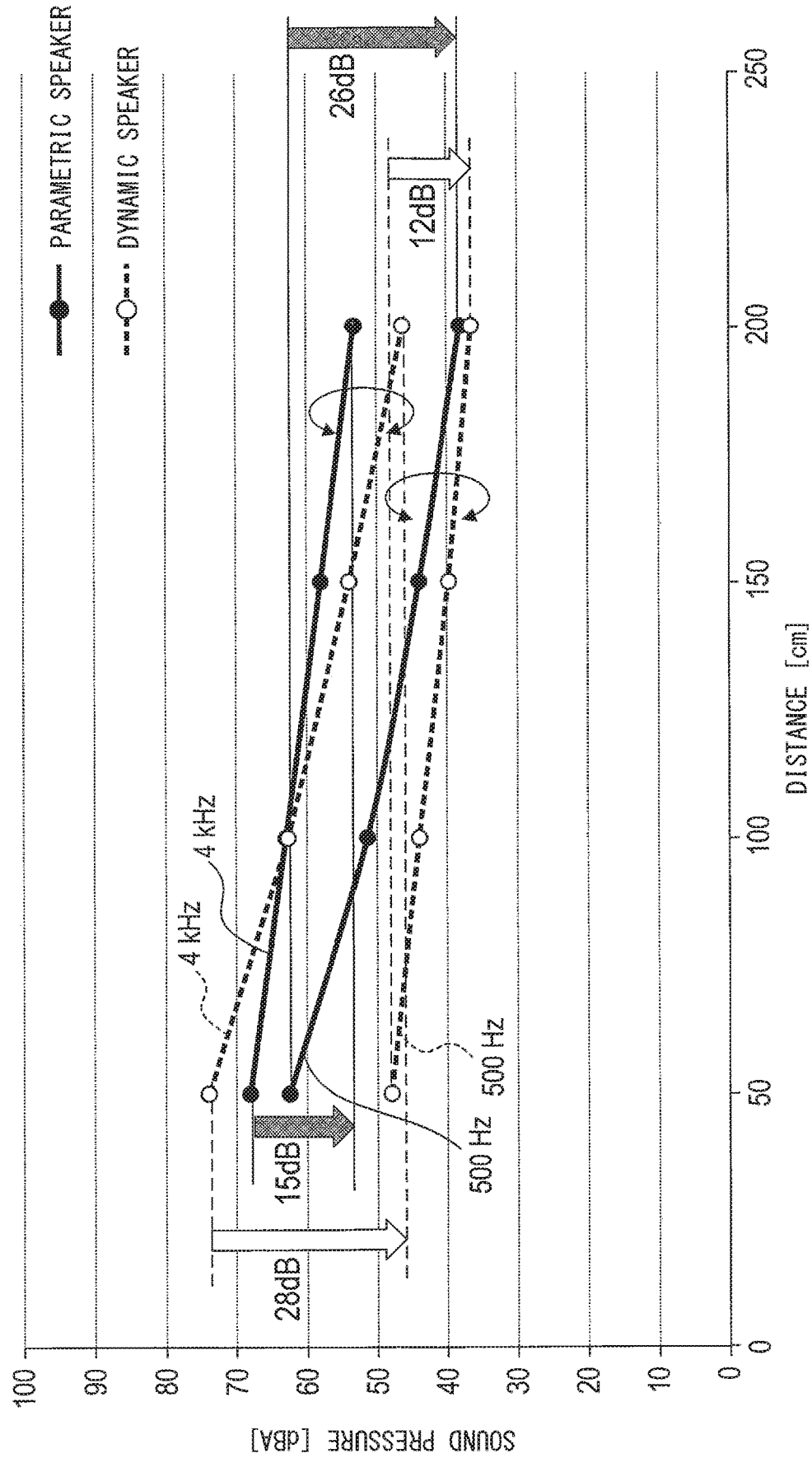
FIG. 5 is a graph showing distance attenuation by an ultrasonic speaker and a dynamic speaker.

Next, the relationship between the sound pressure level and the distance from the speaker is shown in FIG. 5. In the experiment herewith, 500 Hz and 4 kHz sounds are output from the dynamic speaker and the parametric speaker, and the amounts of attenuation (i.e., distance attenuation) are measured when the distances from the speakers are changed from 50 cm to 200 cm.

When 500 Hz sound is output from the dynamic speaker, the sound pressure level is decreased by 12 dB when the distance from the speaker is changed from 50 cm to 200 cm. In addition, when 4 kHz sound is output from the dynamic speaker, the sound pressure level is decreased by 28 dB when the distance from the speaker is changed from 50 cm to 200 cm.

That is, it can be seen that the dynamic speaker is superior in the characteristic of transmitting a low frequency sound farther and is inferior in the characteristic of transmitting a high frequency sound farther.

Next, when 500 Hz sound is output from a parametric speaker such as the ultrasonic speaker 22 of the present embodiment, the sound pressure level is decreased by 26 dB when the distance from the speaker is changed from 50 cm to 200 cm. Further, when 4 kHz sound is output from the parametric speaker, the sound pressure level is decreased by 15 dB when the distance from the speaker is changed from 50 cm to 200 cm.

That is, it can be seen that, unlike a dynamic speaker, a parametric speaker is inferior in the characteristic of transmitting a low frequency sound farther and is superior in the characteristic of transmitting a high frequency sound farther. This tendency is also apparent from FIGS. 6 and 7.

Figure 6:
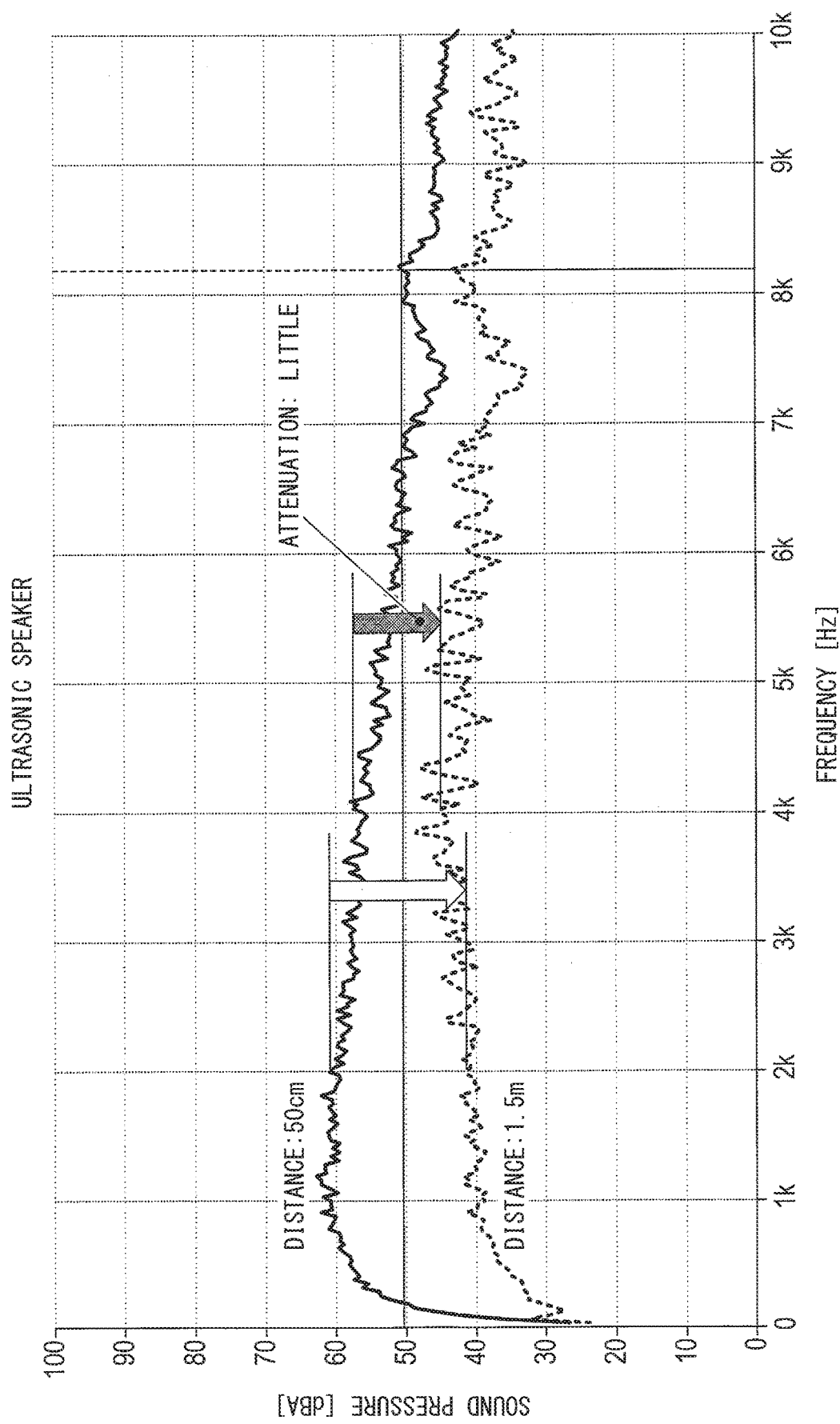
FIG. 6 is a graph showing distance attenuation for respective frequencies by an ultrasonic speaker.

That is, as shown in FIG. 6, when white noise is output from a parametric speaker, the amount of attenuation with respect to a change in distance increases in a frequency band that is approximately less than 2 kHz. The amount of attenuation decreases as the frequency increases from 2 kHz to 4 kHz, and the amount of attenuation is generally constant above 4 kHz.

Figure 7:
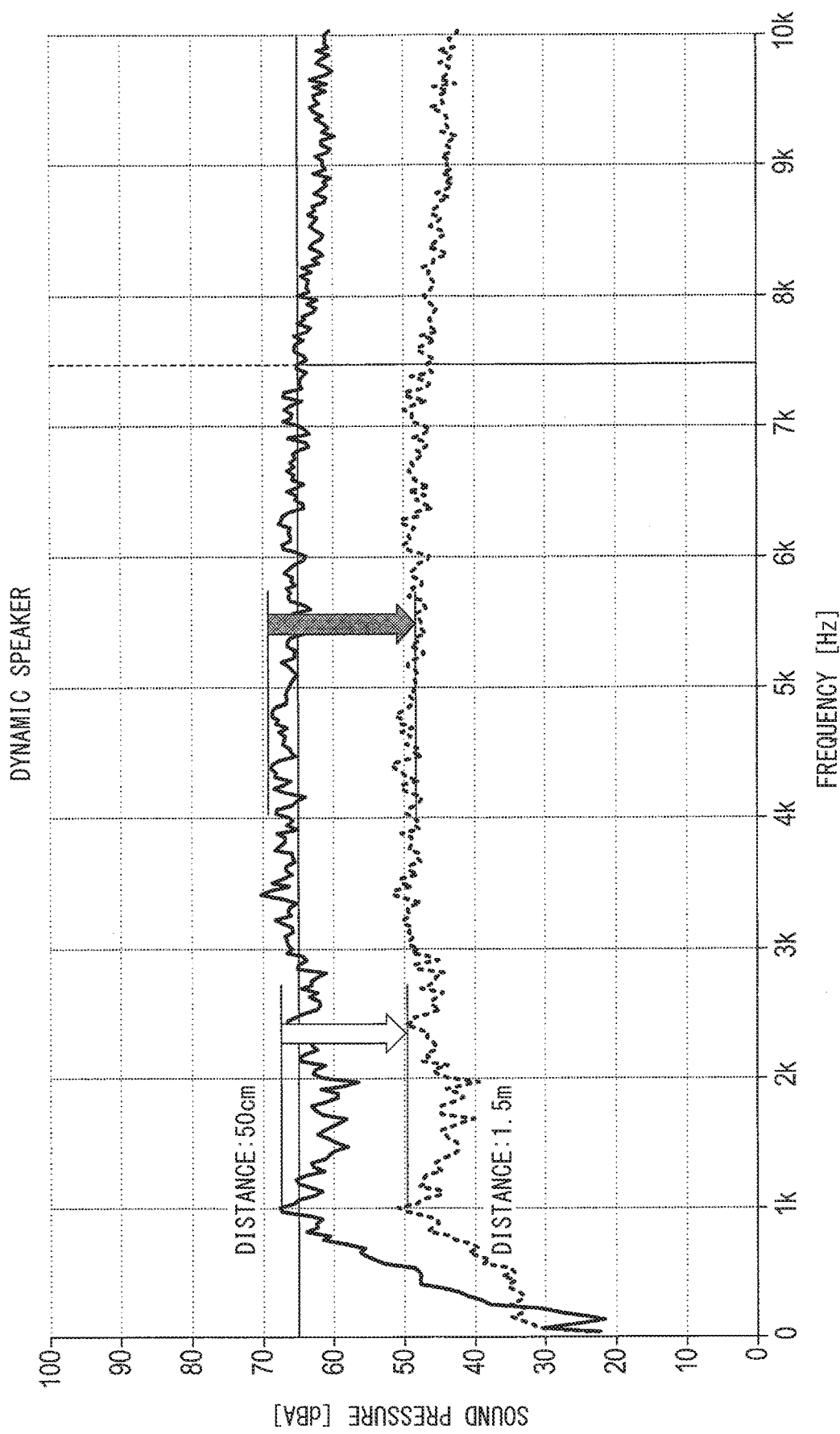
FIG. 7 is a graph showing distance attenuation for respective frequencies by a dynamic speaker.

On the other hand, in the dynamic speaker, as shown in FIG. 7, the attenuation is substantially constant at 1 kHz or more, and the attenuation is smaller as the frequency is lower than 1 kHz.

From these results, it can be seen that the parametric speaker has excellent sound generation characteristics with little attenuation due to a change in distance when outputting a sound of at least 2 kHz or more, preferably 4 kHz or more.

[1-3-3. Measurement with dummy head microphone]

Figure 8:
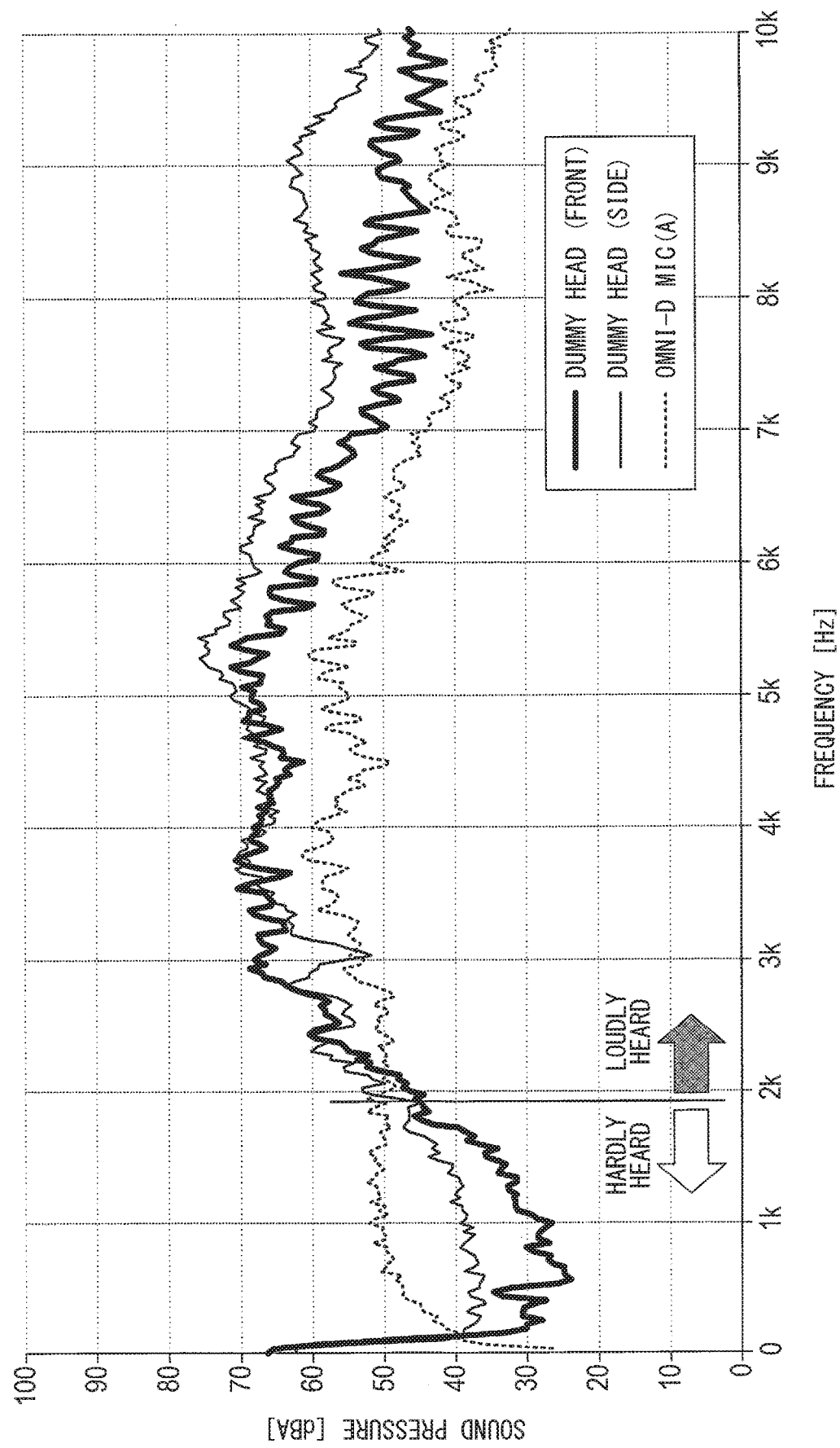
FIG. 8 is a graph showing sound pressure levels for respective frequencies when white noise is received by different microphones.

Next, FIG. 8 is a graph showing the sound pressure level for each frequency when white noise output from a parametric speaker is received by different microphones. The broken line in FIG. 8 indicates the sound pressure level when using an omnidirectional microphone at a distance of 1 m from the sound source, and the two solid lines indicate the sound pressure levels when using dummy head microphones.

Figure 9:
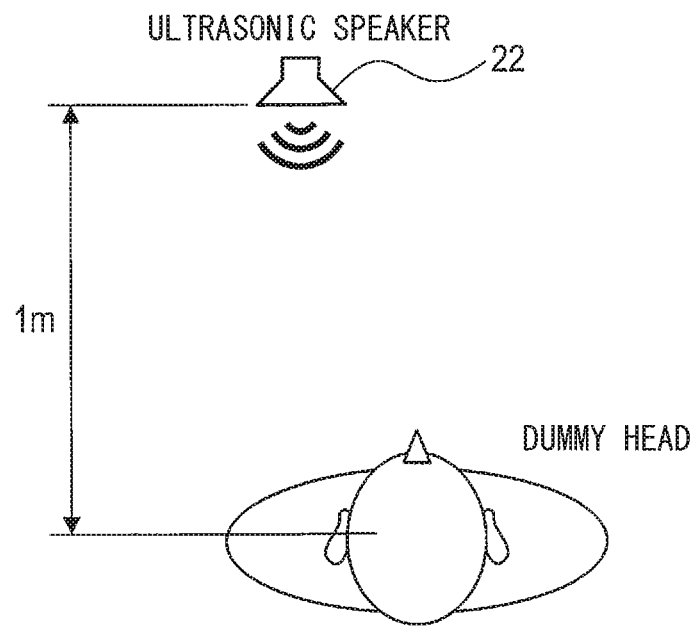
FIG. 9 is a schematic diagram of a dummy head (front)
Figure 10:
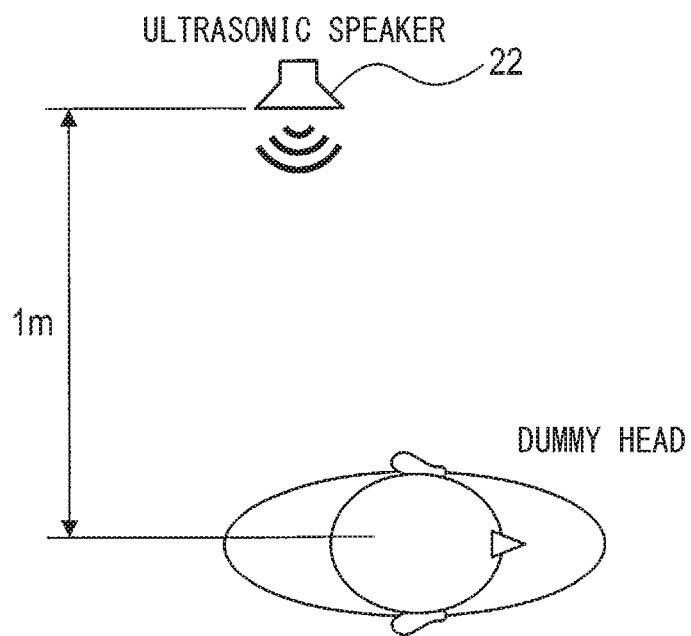
FIG. 10 is a schematic diagram of a dummy head (side)

The dummy head microphone has a microphone in the dolls ear that reproduces the structure of the human ear. The sound pressure levels are measured when the sound source is installed at a distance of 1 m in front of the doll as shown in FIG. 9, and when the sound source is installed at a distance of 1 m on the side of the doll as shown in FIG. 10.

In FIG. 8, the case where the sound source is installed on the front of the doll is denoted as a dummy head (front), and the case where the sound source is disposed on the side of the doll is denoted as a dummy head (side).

From FIG. 8, it can be seen that the sound pressure level with respect to the frequency change is relatively small in the omnidirectional microphone, whereas the sound pressure level with respect to the frequency change is relatively large in the dummy head microphone. In particular, it can be seen that the dummy head microphone has a sound pressure much lower than that of an omnidirectional microphone at a frequency of approximately less than 2 kHz and is difficult to hear. It is considered that such a result is obtained because it is difficult to hear low-frequency sounds that are difficult to diffract due to the structure of the human ear.

On the other hand, in the dummy head microphone, it can be seen that the sound pressure level in the frequency band of about 3 kHz to 6 kHz is increased, and it is easier to hear. The reason why such a result is obtained is that the sound of about 3 kHz to 6 kHz is in a frequency band that easily resonates due to the ear hole due to the structure of the human ear.

Thus, when the characteristics of the human ear are taken into account, it can be said that an alarm sound of about 3 kHz to 6 kHz is easily heard.

[1-3-4. Ultrasonic Speaker Output Measurement]

Figure 11:
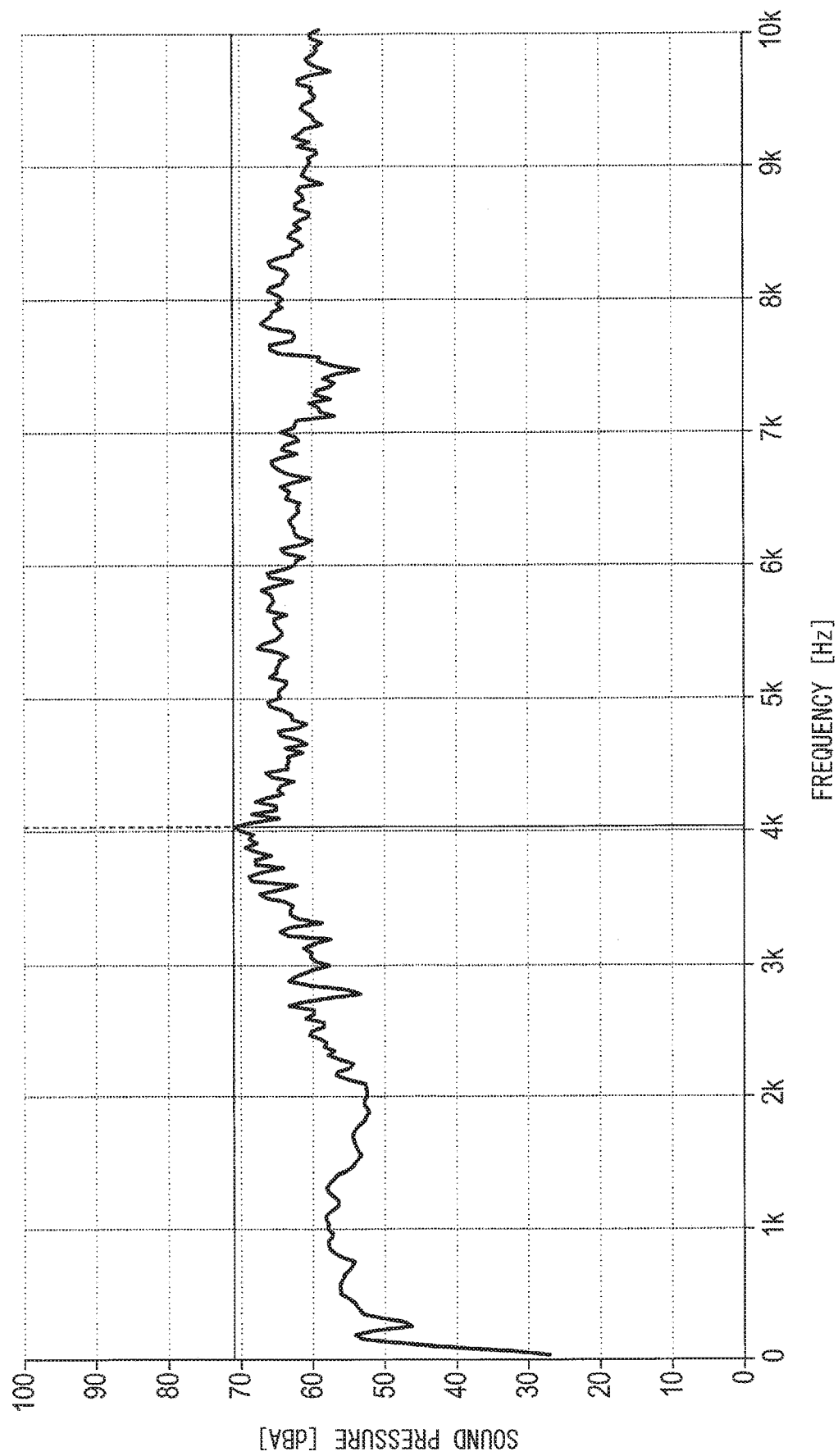
FIG. 11 is a graph showing a sound pressure level for each frequency by an ultrasonic speaker.

Next, FIG. 11 shows a measurement result as follows. A sound wave signal with a constant input level is input to an ultrasonic wave suitable for outputting an ultrasonic wave of approximately 40 kHz while changing the frequency of the sound wave signal, and the sound pressure level of the sound wave output from the speaker with a constant output is measured. From FIG. 11, it can be seen that the output from the ultrasonic speaker has a peak around 4 kHz, and the output is slightly higher than others even at each of 5 kHz and 8 kHz.

That is, it can be seen that the output is improved at a frequency obtained by dividing 40 kHz by an integer n such as 5, 8, 10, or the like. In contrast, the output at a frequency of less than 3 kHz is not improved. This is because sufficient output cannot be obtained at a low frequency of less than 3 kHz due to insufficient energy for outputting sound waves.

[1-4. Effect]

According to the first embodiment described in detail above, the following effects are obtained.

(1a) The alarm apparatus 1 includes a signal generation unit 18 and an ultrasonic output device 20.

The signal generation unit 18 is configured to generate a sound wave signal for outputting an audible sound having a preset frequency by modulating a sound wave signal for outputting an ultrasonic wave. The ultrasonic output device 20 is configured to output an alarm sound based on the sound wave signal.

Such an alarm apparatus 1 can output an alarm sound based on an audible sound generated by modulating an ultrasonic wave, and can output an alarm sound having higher directionality than a normal audible sound. In the range where the alarm sound can be heard, the sound pressure of the alarm sound can be increased, so that the alarm sound can be hardly masked by the environmental sound. Therefore, it is possible to make an alarm sound noticed by persons around the vehicle.

(1b) In the alarm apparatus 1 described above, the signal generation unit 18 is configured to generate a sound wave signal for outputting an audible sound having a pattern in which a stronger level and a weaker level are alternated a plurality of repetition times. Here, human hearing tends to have a difficulty in hearing continuous sounds because they are masked by environmental sounds, but tends not to have a difficulty in hearing sounds in which a stronger level and a weaker level are alternated a plurality of repetition times such as intermittent sounds because they are hardly masked by environmental sounds.

According to such an alarm apparatus 1, since the alarm sound is generated with an audible sound having a pattern in which a stronger level and a weaker level are alternated a plurality of repetition times, the alarm sound can be easily heard.

(1c) In the alarm apparatus 1 described above, the signal generation unit 18 is configured to generate an audio signal that becomes an audible sound that is a pseudo reproduction of a sound of an insect. In general, a sound with a high frequency gives an unpleasant feeling to humans, but a sound of an insect hardly gives an unpleasant feeling despite of a sound with a high frequency.

According to such an alarm apparatus 1, it is possible to output a sound having a high frequency that is easy to hear while suppressing unpleasantness.

(1d) In the alarm apparatus 1 described above, the signal generation unit 18 is configured to generate a post-modulation sound wave signal after a modulation by applying the modulation to a pre-modulation sound wave signal before the modulation such that the frequency after the modulation becomes a frequency obtained by dividing the frequency of the pre-modulation sound wave signal by a predetermined n that is an integer of two or more.

According to such an alarm apparatus 1, the output of the sound wave output from the ultrasonic output device 20 can be improved. It is considered that such an effect is achieved because the timing of the peak of the waveform of the sound wave signal before modulation and the peak of the waveform of the sound wave signal after modulation can be matched.

(1e) In the alarm apparatus 1 described above, the signal generation unit 18 is configured to generate a sound wave signal having a frequency after modulation of 2 kHz or more. Such a configuration can be provided based on the knowledge as follows. That is, in the case of a sound wave obtained by modulating an ultrasonic wave and making it an audible sound, due to the characteristics of the shape of the human ear, the frequency of 2 kHz or higher is easy to hear, and the frequency of less than 2 kHz is easy to hear or not easy to hear depending on the direction of the body of a person.

According to such an alarm apparatus 1, it is possible to output an alarm sound that can be easily heard by a person around the vehicle regardless of the direction of the person around the vehicle.

(1f) In the alarm apparatus 1 described above, the signal generation unit 18 is configured to generate a sound wave signal having a frequency after modulation within a range of 4 kHz to 5 kHz. Such a configuration is provided based on the knowledge as follows. That is, an alarm sound with a sound wave frequency in the range of 4 kHz to 5 kHz has a frequency band in which a large sound pressure can be obtained due to the sound generation characteristics of an ultrasonic speaker, and is easy to hear far away with little attenuation due to distance.

According to such an alarm apparatus 1, an alarm sound can be transmitted farther with small energy.

3. Other Embodiments

As mentioned above, although embodiment of the present disclosure is described above, the present disclosure is not limited to the above-mentioned embodiment, and can carry out various modifications.

(3a) In the above-described embodiment, the sound wave simulating the sound of bell-ringing cricket including the sound wave having a frequency in the range of 4 kHz to 5 kHz is output as the alarm sound. However, there is no need to be limited to this. For example, an alarm sound may be provided to include at least one of three different sound waves or any combinations of such three different sound waves; such three different sound waves are (i) a sound wave having a frequency of 2 kHz or more, (ii) a sound wave having a frequency of 4 kHz to 5 kHz, and (iii) a sound wave in which a stronger level and a weaker level are alternated a plurality of repetition times.

(3b) In the above embodiment, an audible sound is generated by the ultrasonic modulation, but this configuration is not essential. Without need to be limited thereto, another configuration not using any ultrasonic modulation may be provided. That is, the effects shown in the above (1b) and (1c) can be enjoyed even in a configuration which includes the signal generation unit 18 generating an audio signal for outputting an audible sound having a pattern in which a stronger level and a weaker level are alternated a plurality of times, or the signal generation unit 18 generating an audio signal that becomes an audible sound that simulates a sound of an insect.

(3c) A plurality of functions of one constituent element in the above embodiments may be realized by a plurality of constituent elements, or a single function of one constituent element may be realized by a plurality of constituent elements. Further, a plurality of functions of a plurality of constituent elements may be realized by one constituent element, or one function of a plurality of constituent elements may be realized by one constituent element. Moreover, a part of the configuration of the above embodiments may be abbreviated. In addition, at least a part of the configuration of the above embodiments may be added to or replaced with the configuration of the other embodiment.

(3d) The present disclosure can also be realized in various forms in addition to the alarm apparatus 1 described above, such as a system including the alarm apparatus 1 as a constituent element, a program for causing a computer to function as the alarm apparatus 1, a non-transitory tangible storage medium such as a semiconductor memory storing the program, an alarming method.

4. Correspondence Between Configuration of Embodiments and Configuration of Present Disclosure In the above embodiments, the ultrasonic output device 20 corresponds to an alarm sound output device or a sound generator of the present disclosure; the signal generation unit 18 (i.e., the signal generator) corresponds to a computing unit or a processing unit of the present disclosure.

For reference to further explain features of the present disclosure, the description is added as follows.

As described above, there is known a technology which generates an engine sound of the vehicle in a pseudo manner, and outputs the engine sound to the surroundings as an alarm sound, thereby making it easy for a nearby person such as a pedestrian to notice the approach of the vehicle.

As a result of detailed studies, the inventor has found an issue of the above technology; the issue is that the alarm sound is masked by the environmental sound so that it is difficult for a surrounding person to notice the alarm sound.

It is thus desired to provide an alarm apparatus, which is mounted on a vehicle and outputs an alarm sound that is easily noticed by a surrounding person.

Aspects of the present disclosure described herein are set forth in the following clauses.

According to an aspect of the present disclosure, an alarm apparatus is provided to include a signal generation unit and an alarm sound output device.

The signal generation unit is configured to generate a second sound wave signal having a frequency that is difficult to be masked by an environmental sound by applying modulation to a first sound wave signal for outputting an ultrasonic wave. The alarm sound output unit is configured to output an alarm sound based on the second sound wave signal. Further, the alarm apparatus may include a processor including the signal generation unit, the processor being connected communicably with the sound generation device. Furthermore, such a processor may be implemented as (i) a central processing unit (CPU) along with memory storing instructions executed by the CPU or (ii) hardware circuitry including an analog circuit and/or digital circuit with no CPU, or (iii) a combination of the CPU along with memory and the hardware circuitry.

Such an alarm apparatus outputs an alarm sound based on an audible sound generated by modulating an ultrasonic wave. Therefore, an alarm sound having higher directionality than a normal audible sound can be output. In the range where the alarm sound can be heard, the sound pressure of the alarm sound can be increased, so that the alarm sound can be hardly masked by the environmental sound. It is therefore possible to make an alarm sound easily noticed by persons around the vehicle.

What is claimed is:

1. An alarm apparatus mounted on a vehicle and configured to output an alarm sound around the vehicle, the alarm apparatus comprising:
   a signal generation unit configured to generate a second sound wave signal having a frequency that is hardly masked by an environmental sound by applying modulation to a first sound wave signal for outputting an ultrasonic wave; and
   an alarm sound output device communicably connected with the signal generation unit, the alarm sound output device being configured to output an alarm sound based on the second sound wave signal, wherein
   the signal generation unit is further configured to generate the second sound wave signal for outputting an audible sound over a period of time, the period of time including
      (i) a first duration in which a stronger level sound and a weaker level sound of the audible sound are alternately output as a pattern during the first duration, the pattern being output during the first duration for a plurality of repetitions, and the weaker level sound output immediately following the output of the stronger level sound, and
      (ii) a second duration immediately following the first duration in which no sound is output during the second duration,
   the second duration is longer than the first duration, and
   the period of time for outputting the audible sound repeats at least one time immediately after the end of the second duration.

2. The alarm apparatus according to claim 1, wherein the signal generation unit is configured to generate the second sound wave signal that becomes the audible sound simulating a sound of an insect.

3. The alarm apparatus according to claim 1, wherein the signal generation unit is configured to generate the second sound wave signal after the modulation by applying the modulation to the first sound wave signal such that the frequency after the modulation becomes a frequency obtained by dividing a frequency of the first sound wave signal by a predetermined n that is an integer of two or more.

4. The alarm apparatus according to claim 1, wherein the signal generation unit is configured to generate the second sound wave signal after the modulation by applying the modulation to the first sound wave signal such that the frequency after the modulation becomes 2 kHz or more.

5. The alarm apparatus according to claim 1, wherein the signal generation unit is configured to generate the second sound wave signal after the modulation by applying the modulation to the first sound wave signal such that the frequency after the modulation becomes within a range of 4 kHz to 5 kHz.

6. The alarm apparatus according to claim 1, further comprising:
   a processor including the signal generation unit, the processor being connected with the alarm sound output device.

7. The alarm apparatus according to claim 1, wherein an output duration of the stronger level sound in the pattern is equal to an output duration of the weaker level sound.

8. An alarming method implemented by at least one processor for an alarm apparatus mounted on a vehicle to output an alarm sound around the vehicle, the alarming method comprising:
- generating a signal corresponding to a sound wave having a frequency that is hardly masked by an environmental sound by applying modulation to a sound wave signal for outputting an ultrasonic wave; and
- outputting an alarm sound based on the signal via a speaker, wherein
- as the signal corresponding to the sound wave signal, a signal for outputting an audible sound over a period of time is generated, the period of time including
  - (i) a first duration in which a stronger level sound and a weaker level sound of the audible sound are alternately output in a pattern during the first duration for a plurality of repetitions, and the weaker level sound output immediately following the output of the stronger level sound, and
  - (ii) a second duration immediately following the first duration in which no sound is output during the second duration,
- the second duration is longer than the first duration, and
- the period of time for outputting the audible sound repeats at least one time immediately after the end of the second duration.

9. The alarming method according to claim 8, wherein
as the signal corresponding to the sound wave, the signal becoming the audible sound simulates a sound of an insect.

10. The alarming method according to claim 8, wherein
as the signal corresponding to the sound wave, a signal after the modulation is generated by applying the modulation to the sound wave signal such that the frequency after the modulation becomes a frequency obtained by dividing a frequency of the sound wave signal by a predetermined n that is an integer of two or more.

11. The alarming method according to claim 8, wherein
as the signal corresponding to the sound wave, a signal after the modulation is generated by applying the modulation to the sound wave signal such that the frequency after the modulation becomes 2 kHz or more.

12. The alarming method according to claim 8, wherein
as the signal corresponding to the sound wave, a signal after the modulation is generated by applying the modulation to the sound wave signal such that the frequency after the modulation becomes within a range of 4 kHz to 5 kHz.

* * * * *